March 15, 1932.                    C. PHALEN                    1,849,953
                              ELECTRIC GRASS CUTTER
                     Filed June 20, 1930          2 Sheets-Sheet 1

Inventor

Charles Phalen,

By Clarence A. O'Brien
                        Attorney

March 15, 1932.  C. PHALEN  1,849,953
ELECTRIC GRASS CUTTER
Filed June 20, 1930  2 Sheets-Sheet 2

Inventor
Charles Phalen,

By Clarence A. O'Brien
Attorney

Patented Mar. 15, 1932

1,849,953

UNITED STATES PATENT OFFICE

CHARLES PHALEN, OF HIAWATHA, WEST VIRGINIA

ELECTRIC GRASS CUTTER

Application filed June 20, 1930. Serial No. 462,571.

This invention relates to an improved grass cutter which is operated by a portable electric motor.

Briefly stated, the structure is characterized by a wheel supported axle, upper and lower shield plates, a rotary bladed cutter, and an appropriate safety guard, for the blades of the cutter.

In carrying the inventive conception into practice I have thus developed a simple and economical portable hand-guided grass cutter which may be used sufficiently and to advantage in mowing grass on lawns and the like.

Other features and advantages will become more readily apparent from the following description and drawings.

Figure 2:
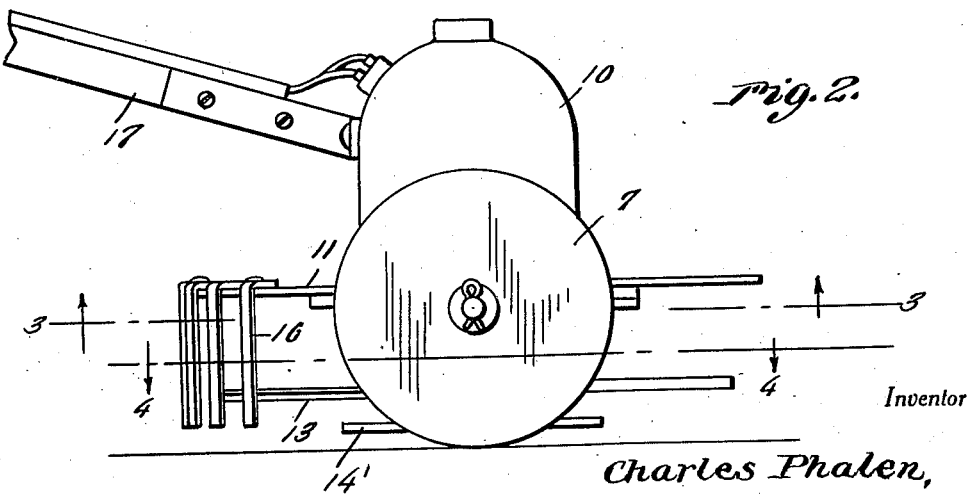
Figure 2 is a side view thereof observing the structure in Figure 1 in a direction from left to right.
Figure 3:
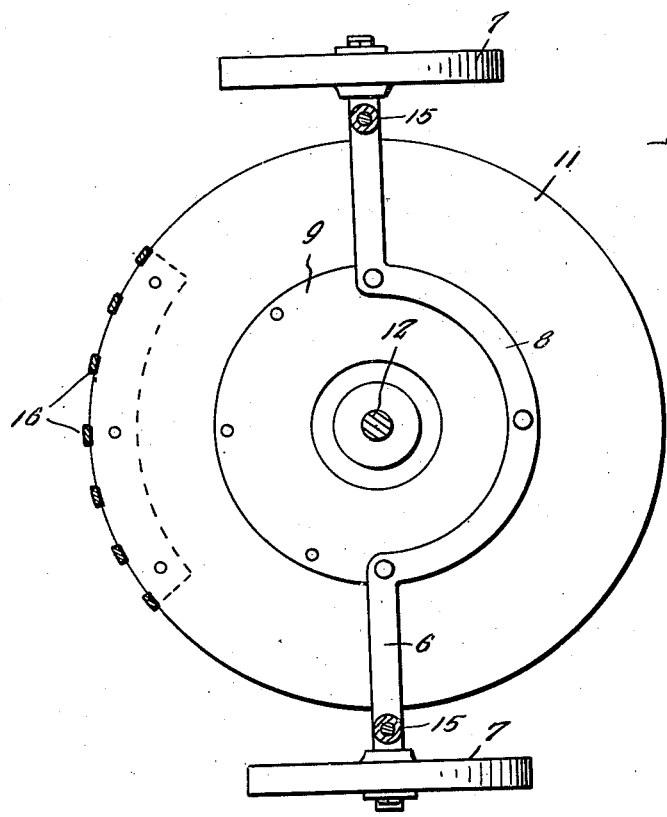
Figure 4:
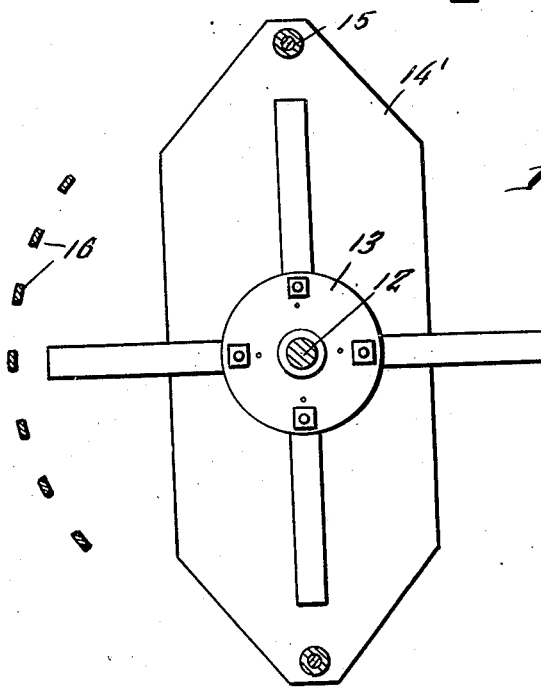

Figures 3 and 4 are horizontal sections on the lines 3—3 and 4—4 respectively of Figure 2.

Figure 1:
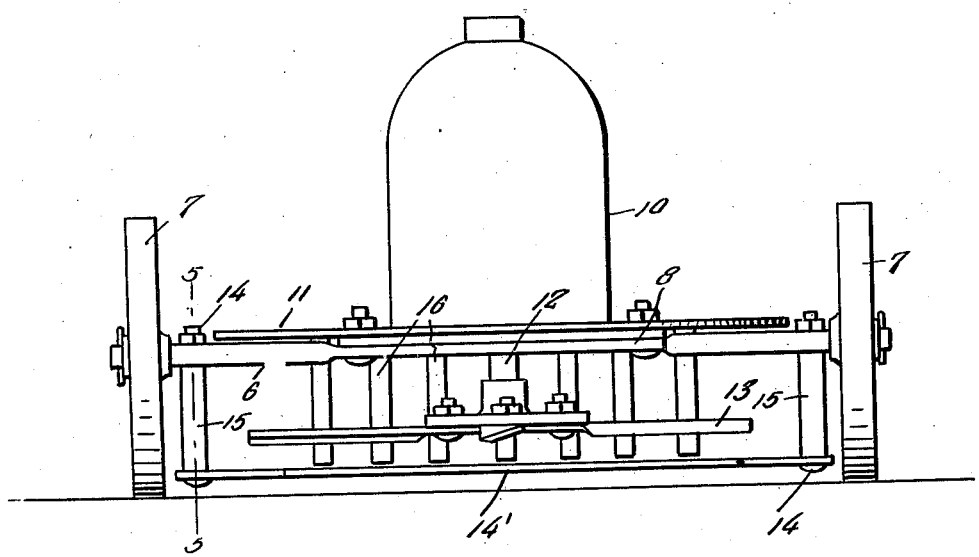
Figure 1 is an elevational view of a grass cutter or electric lawn mower constructed in accordance with the present inventive conception.
Figure 5:
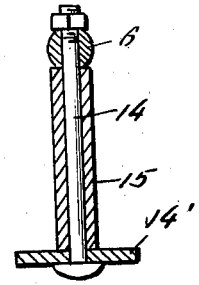

Figure 5 is an enlarged detail section on the line 5—5 of Figure 1.

In the drawings, the reference character 6 designates the horizontal axle having transporting wheels 7 journalled for rotation on the opposite ends thereof. The intermediate flattened portions 8 of the axle is bolted or otherwise fastened to a ring 9 as shown in Figure 3 and this ring is formed with a flange on the upright portable electric motor 10.

The motor is generally arranged to project upwardly through the central opening in an annulus 11 which forms a top shield for confining the cuttings. This member 11 is suitably connected to both the ring 9 and the axle 6. The shaft of the motor is represented by the numeral 12 and this carries a rotary bladed cutter 13 disposed below the shield 11. The cutter is disposed above the lower base plate 14', and this base plate is suspended on bolts 14 attached to the end portions of the axle as shown in Figure 5 and is spaced downwardly through the medium of the surrounding spacing sleeves 15.

The numeral 16 designates generally a finger-equipped safety guard for protecting the operator's knees and legs when using the device. The numeral 17 merely designates the operating handle which is attached suitably to the motor.

Briefly stated, the mower is characterized by a wheel supported axle having a top shield 11, a centralized upright portable electric motor 10 and an operating handle attached thereto. The motor shaft is provided with a rotary bladed cutter disposed in a plane below the plate 11 but above the base shield plate 14' thus arranging it in the proper relationship for efficient cutting.

The blades are of a length to project beyond the relatively narrow base plate 14' as is shown in Figure 2. They are confined to rotate within a path such as will not strike against the depending fingers of the safety guard 16, the latter being attached to and depending from the rear peripheral portion of the plate 11.

The method of use and operation of the device will be quite clear to persons familiar with electric motors and lawn mowers in general.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In an electric lawn mower of the class described, a wheel supported axle, a central vertical portable electric motor attached to said axle, an annular plate surrounding said motor and supported by the axle and disposed in a plane substantially even with the axle and confined between the wheels, a pair of hanger bolts attached to and depending from the end portions of the axle, a base plate suspended by said bolts in spaced parallelism below said first named plate, spacing means surrounding the bolts and located between the axle and top surface of the base plate, the shaft of the motor depending into the space between the said plate, and a rotary horizontal bladed cutter carried by said shaft and having its end portion projecting outwardly beyond the end portions of said base plate.

2. In an electric lawn mower of the class described, a wheel supported axle, a central vertical portable electric motor attached to said axle, an annular plate surrounding said motor supported by the axle and disposed in a plane substantially even with the axle and confined between the wheels, a pair of hanger bolts attached to and depending from the end portions of the axle, a base plate suspended by said bolts in spaced parallelism below said first named plate, spacing means surrounding the bolts and located between the axle and top surface of the base plate, the shaft of the motor depending into the space between the said plate, and a rotary horizontal bladed cutter carried by said shaft and having its end portion projecting outwardly beyond the end portions of said base plate, together with a substantially arcuate finger-equipped guard attached to the marginal portion of the top plate and depending into close proximity to the surface.

3. A mower of the class described comprising an axle, a wheel at each end thereof, a motor supported by the axle, upper and lower horizontal plates supported from the axle and spaced apart, the shaft of said motor extending in the said space, a rotary member attached to the shaft and located between the plates, blades on the member extending beyond the front part of the lower plate and a plurality of fingers connected with the rear part of the top plate and depending downwardly to form guards for the cutter member.

In testimony whereof I affix my signature.
CHARLES PHALEN.